Sept. 18, 1962   G. A. BARTHOLOMEW ET AL   3,054,139
METHOD AND APPARATUS FOR PELLETING MOLTEN SLAG
Filed Aug. 22, 1956   2 Sheets-Sheet 2
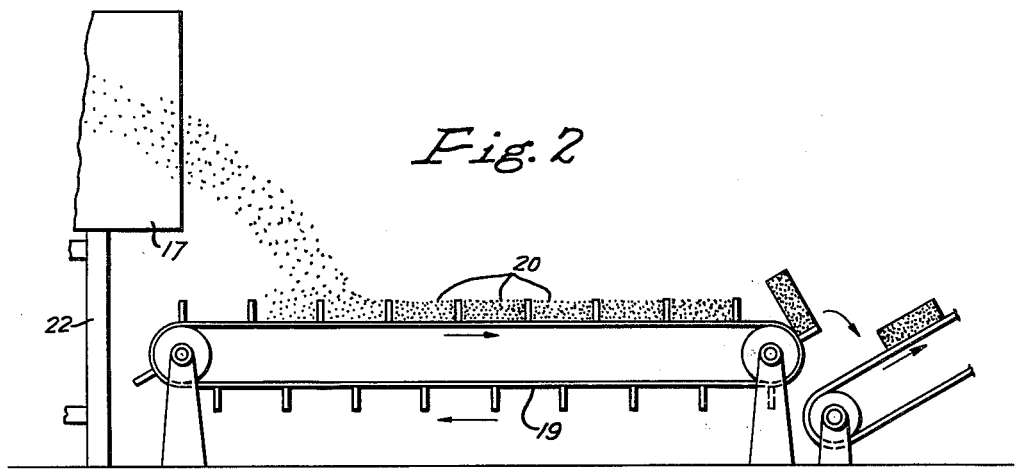
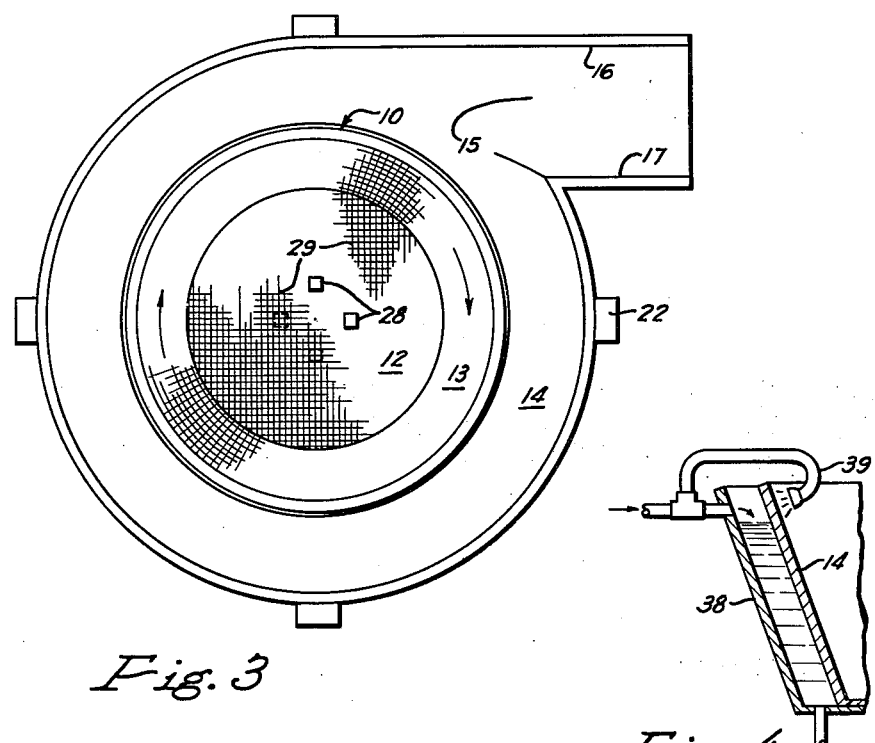
INVENTORS
GEORGE A. BARTHOLOMEW.
TRACY BARTHOLOMEW, DECEASED.
SARAH A. BARTHOLOMEW, EXECUTRIX
BY
Brown, Critchlow, Flick & Peckham
ATTORNEYS

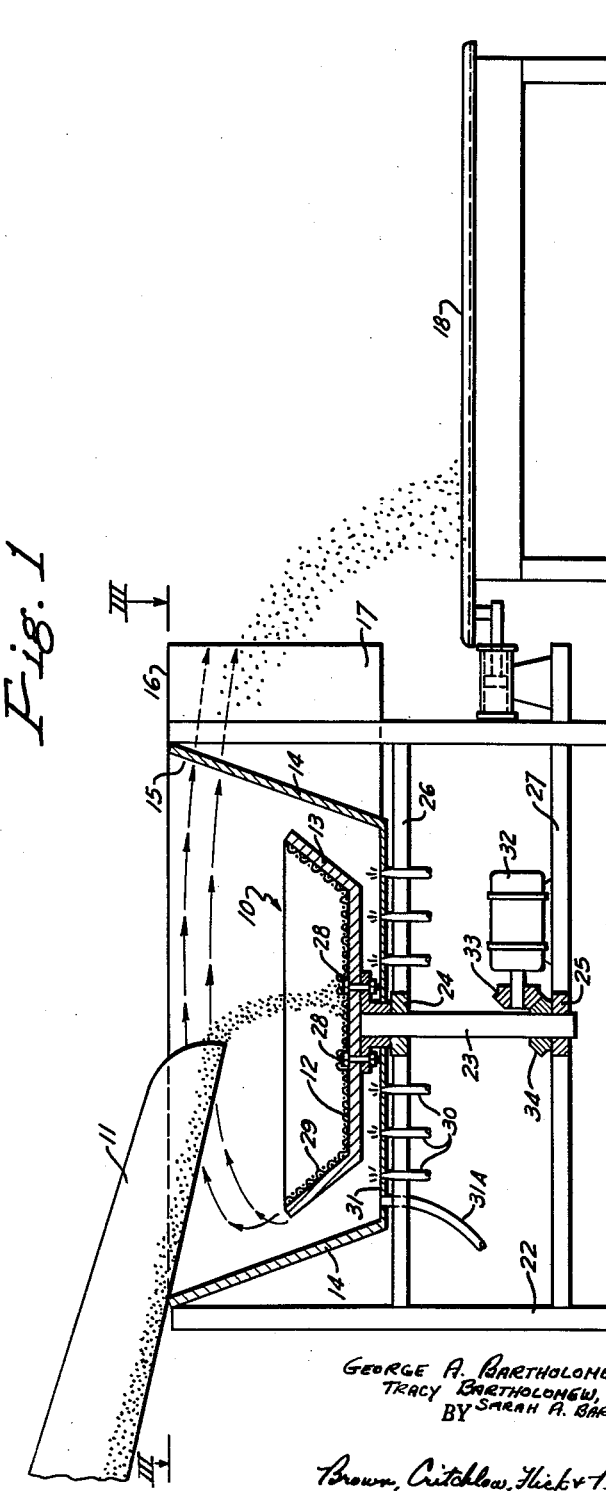

3,054,139
METHOD AND APPARATUS FOR PELLETING MOLTEN SLAG

George A. Bartholomew, 1743 Jamestown Place, Pittsburgh, Pa., and Tracy Bartholomew, deceased, late of Pittsburgh, Pa., by Sarah A. Bartholomew, executrix, 1545 Beechwood Blvd., Pittsburgh, Pa.
Filed Aug. 22, 1956, Ser. No. 605,662
3 Claims. (Cl. 18—2.6)

This invention relates to process and apparatus for processing of molten slag.

A very large amount of slag results from the production of metal, particularly steel, and represents a serious disposal problem to industry. Disposition of this slag by upgrading it would be very desirable, but to date significant large scale uses have not developed. It is believed that the present inability to control the physical characteristics of slag products is partly responsible for this situation. The present invention relates in particular to the production of slag articles characterized by predetermined uniform physical characteristics and to apparatus for producing such articles.

It is an object of the present invention to provide a process for the production of discrete spherical slag pellets of predetermined, uniform, physical characteristics.

It is a further object to provide an apparatus to effect such a processing of molten slag.

In accordance with our invention centrifugal force is applied to a freely falling stream consisting essentially of molten slag to break up the slag into discrete fluid pellets projected through the aid. The pellets, which become spherical and acquire a crust, are diverted to a common path to form a stream of pellets traveling in a predetermined direction, whereupon they are collected. The nature of the resultant product, apart from the characteristics established in the production of discrete pellets by the centrifugal force, is determined as a consequence of action taken or omitted after the fluid pellets have been formed, as will be described below.

The invention will be described in conjunction with the appended drawings, in which:

FIG. 1 is a view of apparatus for producing slag articles of the invention showing the dispersing bowl in section;

FIG. 2 is a view of a pellet collector that may be used in place of that shown in FIG. 1;

FIG. 3 is a horizontal view along the line III—III of FIG. 1; and

FIG. 4 is a view of a segment of a deflecting wall showing a coolant jacket and coolant spray nozzle.

Referring to the drawing, a stream consisting essentially of molten slag is brought to a dispersing element 10 by a trough 11 which terminates above that element so that the slag falls freely thereto. The slag can be obtained directly from a blast furnace and is conducted to the dispersing element without effecting any change in it other than a lowering of temperature due to heat lost in transit. The dispersing element can be a bowl, as shown, or other element having an essentially unobstructed surface such, for example, as a flat disk. In further description of the invention, the dispersing element described will be a bowl.

During operation, the dispersing bowl 10 is rotated at a high rate of speed and thus applies centrifugal force to molten slag impinging on its receiving surface 12. The slag therefore is thrown out against the bowl's upwardly flaring side wall 13, up which it travels and from the upper edge of which it is projected outward through the air in the form of discrete fluid pellets. The bowl is encircled by a spaced deflecting wall 14 which extends above it and intercepts the outwardly flying pellets and deflects them through an opening 15 in the wall. Extending tangentially away from the deflecting wall at one side of the opening is a guide wall 16, which guides the pellets in a stream away from that wall. Preferably, another wall 17 at the opposite side of opening 15 helps to confine and direct the stream of pellets issuing from the opening.

The individual pellets cool and contract almost instantaneously as they are formed and as they travel over the surface of the bowl and then through the air, thereby becoming spherical, and they acquire an encrusted surface. The cooling effect is not great, however, and the interiors of the pellets remain molten.

Pellets issuing from the guide wall 16 are collected by means of a suitable collector placed in their path. The nature of the use contemplated determines the particular collector chosen. By way of example, where slag sand is to be produced, a collector is provided that has means to impart motion to the collected pellets with respect to one another until they cool, for normally the pellets as collected have an average heat content sufficient to fuse adjacent pellets together if they are at rest. By using as a collector a means, such as the fluid operated shuffle tray 18 shown in FIG. 1, or a drag and hoe mechanism or other means to impart motion to collected pellets relative to one another, the pellets can cool without fusing. Alternatively the pellets may be directed into a chamber (not shown) and suspended or fluidized by a gas until they have been cooled, either by heat exchange with the fluidizing gas or by heat exchange with a liquid or vapor in tubes extending into the fluidized bed. Cooling the particles by the use of a fluidized bed is particularly advantageous, for in addition to being a good method of annealing the particles, it constitutes an effective method of recovering the heat content of the slag, which conventionally is wasted. When a shaped object, such as a building block, is desired, the collector may be in the form of an endless belt 19 (refer to FIG. 2) divided into a plurality of appropriately shaped compartments 20, and the collector is moved continuously and smoothly so that the collected pellets in each compartment remain stationary relative to one another and can fuse together into a single mass or block.

A stand 22 supports the bowl, which is attached to the top of a vertical shaft 23 journalled in bearings 24 and 25 in cross members 26 and 27, respectively, of the stand. The slag receiving or inside surface 12 of the bowl may be roughened, if desired. This result may be accomplished by the heads 28 of bolts rigidly connecting the bowl with the shaft 23 (see FIG. 3), or by a wire screen 29 fastened to the bowl, and serves to retain a crust of solidified slag therein, thereby protecting the surface 12 from the effects of hot molten slag. The obtention of the crust is facilitated by cooling the underside of the bowl, as by spraying water into contact with it through nozzles 30 extending up from a cross-member 26, that is adapted to support a plurality of nozzles, through the horizontal wall 31 at the bottom of the deflecting wall 14. Excess water can be drained therefrom through drain 31A. A motor 32, having a bevel gear 33 which meshes with a similar gear 34 on the shaft 23, rotates the bowl. The deflecting wall 14 extends above the side of the bowl as shown, the height chosen being sufficient to insure that the pellets projected from the bowl by centrifugal force will not fly over the top of the wall.

The size of pellet that can be produced is quite variable, ranging in diameter from a few microns to over an inch, and is determined primarily by slag feed rate, slag temperature (or viscosity), and bowl speed. At fixed bowl speed, higher feed rates result in larger pellets; at a fixed feed rate, the larger pellets are produced with slower bowl speeds. Other characteristics of the pellets, and of articles produced from them, are determined by conditions encountered by the fluid pellets after they have been formed. For example, the rate of solidification of the pellets determines whether an amorphous or devitrified product is obtained, because slow cooling is required to devitrify slag while rapid or quench cooling results in amorphous slag. By air-cooling the pellets to solidify them, they will devitrify. This result can also be obtained when the cooling rate is accelerated somewhat over that resulting from air-cooling. By cooling the deflecting wall 14, the pellets will be cooled upon contact therewith. Thus, as shown in FIG. 4, the deflecting wall can be provided with a jacket 38, on its outside, through which water can be run as desired to cool the wall. An additional advantage of this adaptation is that there is less tendency for the hot slag to stick to a cool wall.

The density of a slag pellet or article also can be varied. Maximum density occurs when the pellets are air cooled. The presence of slight amounts of water (or steam) in the trajectory of the fluid pellets results in a certain amount of porosity. Slightly larger amounts of water in contact with the pellets before they have cooled sufficiently to form an impervious crust, will foam the pellets so that cellular material may be produced. The rotation of the bowl disperses some of the water, employed to cool its bottom, into the trajectory of the pellets unless means are provided to retain the water below the top of the bowl. Additional cellularizing water can be provided by directing light sprays of water over the surface of the deflecting wall through means 39, such as a spray nozzle, that can be provided for that purpose as shown in FIG. 4. The same result can be achieved by adapting the spray means to spray cellularizing water into the spaces through which slag pellets travel or into the dispersing bowl. In this latter instance, particular care should be taken to avoid quench cooling the slag.

Where articles are to be produced by fusing a plurality of the spherical pellets, additional density control is available by variation in filling the receptacles or molds, and in compression of the particles within the molds. Furthermore, by control of the heat content of pellets in the mold, unique, structurally superior articles may be produced which combine the multiple advantages of high porosity with impermeability to liquids. Thus, with pellets having average heat content just sufficient to effect fusion of the crusts of adjacent pellets, a true fusion bonded unit results. Where the heat content is sufficiently high to render the pellet shells fluid enough to permit flow, the fluid crust material readily surrounds and entraps inter-particle gas pockets making the slag a continuous phase and the trapped gas a discontinuous phase, thus creating a highly porous yet impermeable article. Obviously, the more quickly the pellets are collected the higher will be their heat content, other conditions being constant.

Slag pellets and articles produced therefrom in accordance with the present invention are devitrified solids in contrast to the vitrified amorphous nature of materials known in the art. By choice of feed rate, slag temperature, and bowl speed, pellets of predetermined size can be produced. By contacting the pellets with a controlled amount of water the density of the pellets can be varied at will. By control of heat content or of packing in a mold, the physical characteristics of fused articles can be further controlled. Thus the physical characteristics are predeterminable and can be made uniform.

Solidified slag pellets of this invention are particularly useful as sand or aggregate in the formation of cement articles. Tests have shown improvement in tension and compression values of cement articles when using slag pellets as compared to similar articles employing conventional sands. Similarly, the uniformity of structural articles of agglomerated pellets suggests the manufacture of building blocks and similar items in accordance with the procedure of this invention, for a product having predetermined characteristics can be made.

While the invention has been described and illustrated with particular reference to blast furnace slag, it should be understood that other mineral melts which are capable of similar treatment are within the scope of the term "slag" as used in the specification and the appended claims.

According to the provisions of the patent statutes, we have explained the principle of our invention and have illustrated and described what is now considered to represent its best embodiment. However, we desire to have it understood that, within the scope of the appended claims, the invention may be practiced otherwise than as specifically illustrated and described.

We claim:

1. The method of producing devitrified spherical slag articles, comprising feeding a stream consisting essentially of molten blast furnace slag, in the substantial absence of quenching medium, as a freely falling stream to an unobstructed substantially plane surface rotating with sufficient speed to break up said slag stream into discrete fluid pellets and to project them tangentially through the air from said rotating surface as spheres with surface crusts, and with sufficient speed and inertia to carry said spheres around an encircling retaining member in engagement with its inner surface, guiding said moving spheres along that surface to a slot therein and discharging said spheres therethrough to form a stream of spheres traveling in a predetermined direction, whereby said spheres slowly cool through the slag solidification temperature range, and collecting the resulting devitrified spherical articles.

2. The method of producing devitrified spherical slag articles, comprising feeding a stream consisting essentially of molten blast furnace slag, in the substantial absence of quenching medium, as a freely falling stream to an unobstructed substantially plane surface rotating with sufficient speed to break up said slag stream into discrete fluid pellets and to project them tangentially through the air from said rotating surface as spheres with surface crusts, and with sufficient speed and inertia to carry said spheres around an encircling retaining member in engagement with its inner surface, guiding said spheres along that surface to a slot therein and discharging said spheres therethrough to form a stream of spheres traveling in a predetermined direction, collecting said spheres in groups from said stream, and imparting motion to the collected spheres relative to one another until they are cool enough to avoid fusing together, whereby said spheres slowly cool through the slag solidification temperature range, and recovering the resulting devitrified spherical articles.

3. Apparatus for producing devitrified slag articles from a freely falling stream consisting essentially of molten blast furnace slag, comprising a bowl-shaped dispersing element having a substantially plane slag-receiving surface open to the atmosphere and adapted to receive such a stream from any point above it, means for rotating said dispersing element at a high rate of speed for breaking up molten slag impinging on said receiving surface into discrete fluid pellets and projecting them rapidly through the air as spheres tangentially from said element, a pellet guide wall spaced from and surrounding said element and extending above it, said wall having an exit opening therein, said guide wall receiving the traveling pellets and guiding them to said exit, a second wall extending substantially tangentially from said opening to direct moving pellets in a stream from said guide wall, a receptacle positioned to collect pellets in said stream, and means to impart motion to collected pellets relative to one another in said receptacle.

(References on following page)

References Cited in the file of this patent

UNITED STATES PATENTS

| | | |
|---|---|---|
| 65,339 | Butcher et al. | June 4, 1867 |
| 757,035 | Gramm | Apr. 12, 1904 |
| 1,051,844 | Passow | Jan. 28, 1913 |
| 1,483,241 | Opderneck | Feb. 12, 1924 |
| 1,671,866 | Lineville et al. | May 29, 1928 |
| 2,062,093 | Kann | Nov. 24, 1936 |
| 2,153,739 | Buss | Apr. 11, 1939 |
| 2,236,691 | Meinzer | Apr. 1, 1941 |